H. B. HAMMON.
Hand-Seeder.
No. 27,365.
Patented Mar. 6, 1860.
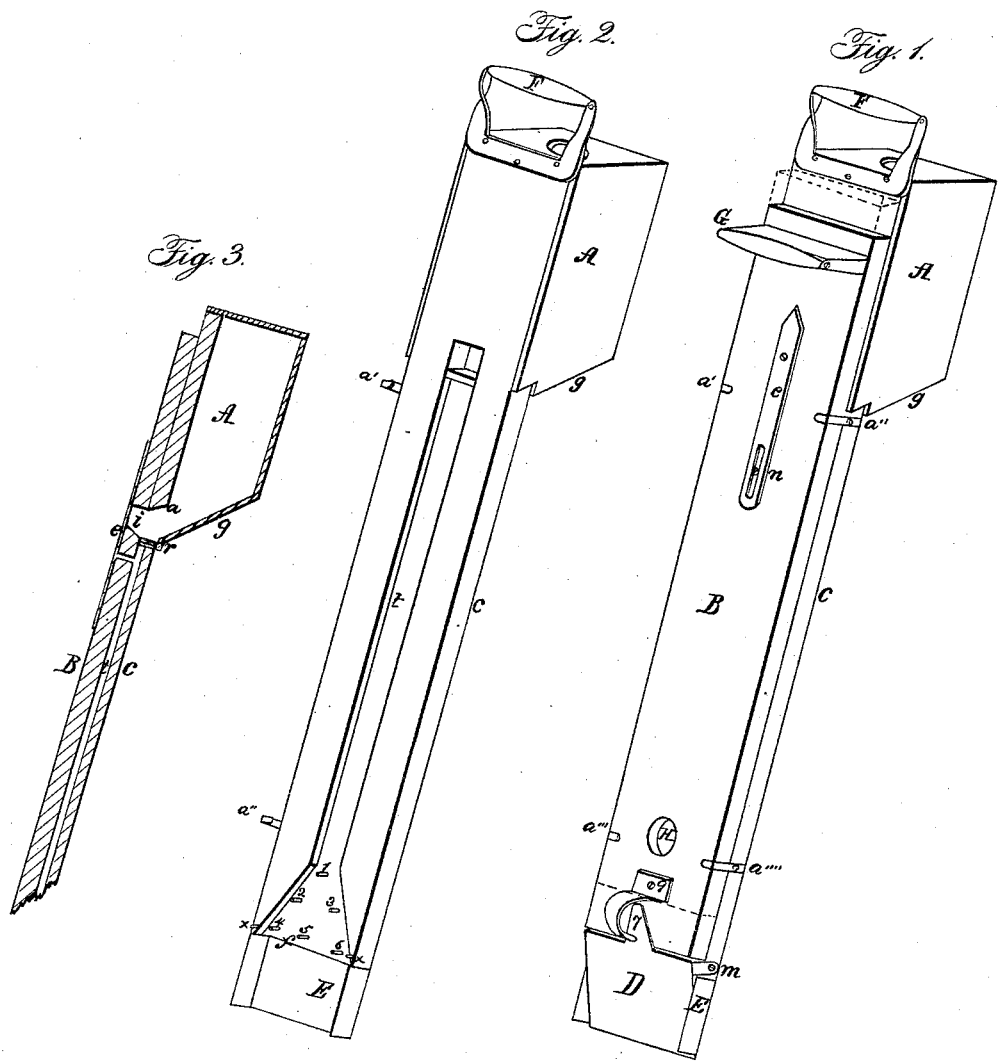
Witnesses:
Inventor:

UNITED STATES PATENT OFFICE.

HEMAN B. HAMMON, OF BRISTOLVILLE, OHIO.

IMPROVEMENT IN HAND CORN-PLANTERS.

Specification forming part of Letters Patent No. 27,365, dated March 6, 1860.

*To all whom it may concern:*

Be it known that I, HEMAN B. HAMMON, of Bristolville, county of Trumbull, and State of Ohio, have invented a new and Improved Hand Corn-Planter; and I do hereby declare that the following is a full and exact description thereof, reference being had to the accompanying drawings, and to the letters of reference marked thereon, in which—

Figure 1 is a perspective view of a corn-planter constructed after my invention. Fig. 2 is a perspective view of Fig. 1, with the sliding front B and lid D removed. Fig. 3 is a central sectional view of Fig. 1.

Similar letters of reference indicate corresponding parts in each of the figures.

My invention consists in an arrangement and combination of parts whereby a simple, cheap, and durable hand corn-planter is obtained.

To enable others skilled in the art to make and use my invention, I will proceed to describe its construction and operation.

A is the seed-chamber, with an inclined bottom, $g$.

C is the back, and B the sliding front.

G and F are handles by which the machine is carried and operated.

$e$ is the gage by which the quantity of seed to be planted is measured.

$n$ is the set-recess.

$a'$ $a''$ $a'''$ $a''''$ are clasps which keep the sliding front in connection with the back C, but allow it to play freely up and down.

9 is a crooked finger made fast to the sliding front, which opens the lid D, when the sliding front B is drawn up, by acting on branch 7 on lid D, which is hinged at $m$.

E is the mouth-piece, made fast to the back C.

X X (see Fig. 2) are pins to stop the sliding front in its downward movement.

The mouth $f$ is made flaring, so that the seed will scatter as it enters the mouth-piece E.

$t$ is a channel in the back C, extending up to the opening $a$.

$i$ is the measuring-cavity.

$r$ is a brush which scrapes off the surplus seed, and prevents all liability of clogging or otherwise injuring the seed.

The lid D is longer than the mouth-piece E, so that it will open the receptacle below the mouth-piece E for the deposit of the seed. By then closing the lid D, the seed is pressed into the side of the hill, which prevents all liability of the seeds being lifted out of the ground, and at the same time the seed is brought into close and perfect contact with the soil, the dirt falls loosely around and over and does not obstruct the coming up and rapid growth of the plant.

Great advantage is also gained by having the seed-chamber arranged on the top of the back C. When the seed is deposited therein and the machine taken up by the handles, it balances in the operator's hands and gives it the proper inclination, so that the hands and arms of the operator will be free from all strain and fatigue, which he would otherwise experience.

The machine is operated by simply taking it by the handles and striking the point into the ground the proper depth. The sliding front is then drawn up, which causes the lid D to open and allow the deposit of the seed. Then by pushing the sliding front down it closes the lid and presses the seed into the side of the hill, and at the same times carries a charge of seed from the seed-chamber, ready for the next hill. The operation thus continues until the whole field is planted.

What I claim as my invention, and desire to secure by Letters Patent, is—

The arrangement of the seed-box A, sliding front B, back C, lid D, mouth-piece E, handles F and G, gage $e$, set-screw $n$, clasps $a'$ $a''$ $a'''$ $a''''$, the crooked finger 9, branch 7, pins X X, the flaring mouth $f$, channel $t$, measuring-cavity $i$, and brush $r$, for joint operation, as described, for the purpose specified.

HEMAN B. HAMMON.

Witnesses:
 WM. H. HOWE,
 JACOB HAMMOND.